(12) United States Patent
Budampati et al.

(10) Patent No.: US 8,494,479 B2
(45) Date of Patent: Jul. 23, 2013

(54) SYSTEM AND METHOD FOR OPTIMIZING POWER SUPPLIES IN A WIRELESS TRANSCEIVER

(75) Inventors: Ramakrishna S. Budampati, Maple Grove, MN (US); Anoop K. Mathur, Shoreview, MN (US); Hai D. Pham, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 1318 days.

(21) Appl. No.: 11/787,321

(22) Filed: Apr. 16, 2007

(65) Prior Publication Data
US 2008/0176608 A1  Jul. 24, 2008

Related U.S. Application Data
(60) Provisional application No. 60/795,526, filed on Apr. 27, 2006.

(51) Int. Cl.
*H04B 1/16* (2006.01)

(52) U.S. Cl.
USPC .......... 455/343.4; 455/571; 320/126

(58) Field of Classification Search
USPC . 455/571–574, 127.5, 343.1–343.6; 320/101, 320/126
See application file for complete search history.

(56) References Cited

U.S. PATENT DOCUMENTS

| | | | |
|---|---|---|---|
| 4,825,425 A * | 4/1989 | Turner | 368/7 |
| 5,203,020 A | 4/1993 | Sato et al. | |
| 5,650,669 A | 7/1997 | Aldous | |
| 5,759,712 A | 6/1998 | Hockaday | |
| 6,021,332 A * | 2/2000 | Alberth et al. | 455/552.1 |
| 6,037,880 A * | 3/2000 | Manion | 340/932.2 |
| 6,104,937 A | 8/2000 | Fujimoto | |
| 6,326,097 B1 | 12/2001 | Hockaday | |
| 6,643,527 B2 * | 11/2003 | Satoh et al. | 455/574 |
| 6,715,673 B2 * | 4/2004 | Fulcher et al. | 235/381 |
| 7,127,229 B2 * | 10/2006 | Baba et al. | 455/404.1 |
| 2001/0017188 A1 * | 8/2001 | Cooley et al. | 156/305 |
| 2005/0085277 A1 * | 4/2005 | Chen et al. | 455/572 |

FOREIGN PATENT DOCUMENTS
| | | |
|---|---|---|
| EP | 0 494 529 A1 | 7/1992 |
| EP | 0 613 257 A2 | 8/1994 |

OTHER PUBLICATIONS
International Search Report issued in connection with PCT Application No. PCT/US2007/067401 dated Dec. 20, 2007.

* cited by examiner

*Primary Examiner* — Christian Hannon
(74) *Attorney, Agent, or Firm* — Schwegman, Lundberg & Woessner, P.A.

(57) ABSTRACT

Different components in a wireless transceiver are powered using different power supplies. For example, one or more first tasks in the wireless transceiver can be powered with a Galvanic cell, and one or more second tasks in the wireless transceiver can be powered with a fuel cell. The one or more first tasks could represent higher-current or intermittent tasks, and the one or more second tasks could represent lower-current or continuous tasks. The one or more first tasks could include transmission of a radio frequency (RF) signal, which may involve RF signal modulation or RF signal amplification. The one or more second tasks could include RF signal tuning, RF signal reception, RF signal demodulation, analog-to-digital conversion, digital-to-analog conversion, digital signal processing, operation of a controller, illumination of a display, operation of an audio speaker, operation of a microphone, or operation of a keypad.

22 Claims, 7 Drawing Sheets

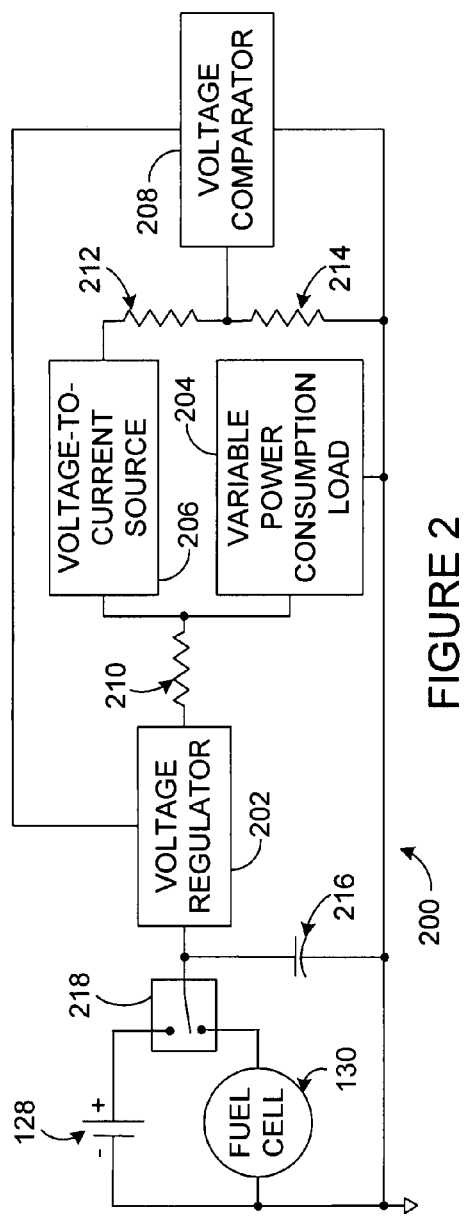
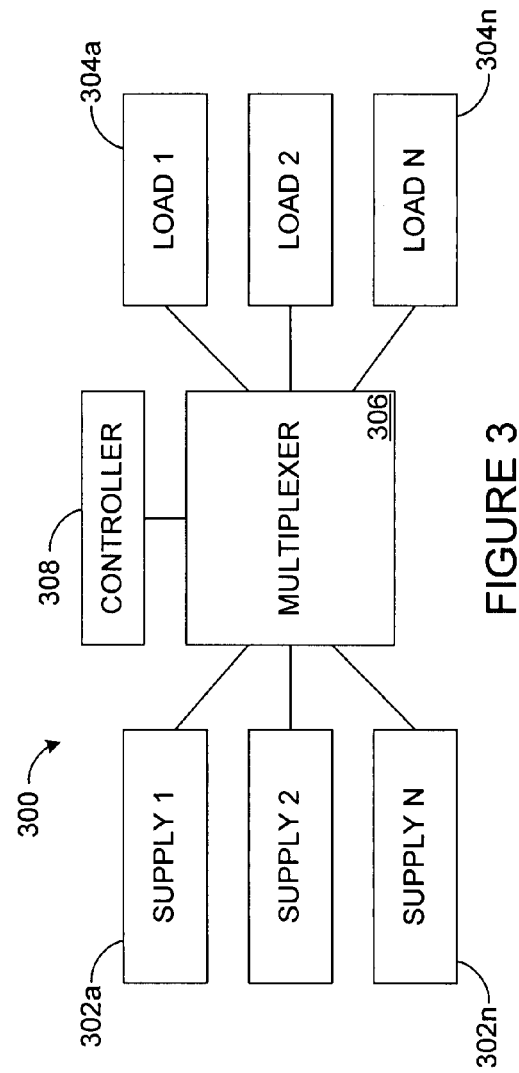

SYSTEM AND METHOD FOR OPTIMIZING POWER SUPPLIES IN A WIRELESS TRANSCEIVER

CROSS-REFERENCE TO RELATED APPLICATIONS

This application claims priority under 35 U.S.C. §119(e) to U.S. Provisional Patent Application No. 60/795,526 filed on Apr. 27, 2006, which is hereby incorporated by reference.

This application is also related to U.S. patent application Ser. No. 11/483,920 filed on Jul. 10, 2006, which is hereby incorporated by reference.

TECHNICAL FIELD

This disclosure relates generally to wireless transceivers and more specifically to a system and method for optimizing power supplies in a wireless transceiver.

BACKGROUND

Wireless transceivers are used in a wide variety of handheld, portable, and other devices. Wireless transceivers typically enable the devices to communicate wirelessly with other wireless devices and systems. Conventional devices often use batteries to provide the operating power needed by the wireless transceivers.

Typical battery-powered wireless transceivers often undertake numerous radio frequency (RF) related activities, such as transmission, reception, and processing of RF signals. While RF transmission tasks may consume power and require a higher current draw from a battery, RF reception and other tasks (such as operation in idle mode or sleep mode) may require lower current. However, the continual current draw of these non-transmission tasks may still consume a lot of battery power, thereby decreasing the battery's life.

An adequate energy supply is often a crucial design aspect in the development of wireless transceivers used in devices such as mobile telephones and wireless sensors. In addition to the power demands presented by conventional tasks, increasing the functionality of a device (such as by providing faster Internet access or more complex gaming features) or incorporating advanced components into the device (such as an improved video screen or camera) generally increases power consumption. This often leads to even higher demands for increased battery power and improved battery life.

Several efforts have been made to reduce power consumption and improve battery life of these and other types of devices. These efforts have included optimization of circuit architectures and designing low-current components. However, gains that can be achieved through efficiency are often limited.

Moreover, as the components of a device or the devices in a system change (such as when devices are added to or removed from a system), the power requirements of the device or system may change. The power requirements may also change when a component or device changes its mode of operation. A power supply may be designed to provide power at lower levels, higher levels, sustainable levels, or at different currents or voltages for a specific set of power requirements. If the power requirements of a component or device change, however, one power supply may not be well suited to continue providing power to the component or device.

SUMMARY

This disclosure provides a system and method for optimizing power supplies in a wireless transceiver.

In a first embodiment, a method includes powering one or more first tasks in a wireless transceiver with a first power supply. The method also includes powering one or more second tasks in the wireless transceiver with a second power supply.

In particular embodiments, the one or more first tasks represent higher-current or intermittent tasks, and the one or more second tasks represent lower-current or continuous tasks.

In other particular embodiments, the first power supply includes a Galvanic cell, and the second power supply includes a fuel cell.

In still other particular embodiments, the one or more first tasks include transmission of a radio frequency (RF) signal, which could include RF signal modulation and/or RF signal amplification. Also, the one or more second tasks could include RF signal tuning, RF signal reception, RF signal demodulation, analog-to-digital conversion, digital-to-analog conversion, digital signal processing, operation of a controller, illumination of a display, operation of an audio speaker, operation of a microphone, and/or operation of a keypad.

In a second embodiment, an apparatus includes a transmitter, a receiver, a first power supply, and a second power supply. The first power supply is operable to power the transmitter. The second power supply is operable to power the receiver.

In a third embodiment, a computer program is embodied on a computer readable medium. The computer program includes computer readable program code for identifying multiple connections between multiple power supplies and multiple loads. The connections are identified based on power levels of at least some of the power supplies and power requirements of at least some of the loads. The computer program also includes computer readable program code for initiating formation of the connections.

In a fourth embodiment, an apparatus includes a multiplexer having multiple power inputs operable to be coupled to multiple power supplies and multiple power outputs operable to be coupled to multiple loads. The multiplexer is operable to selectively couple the power inputs to the power outputs. The apparatus also includes a controller operable to control the selective coupling of the power inputs to the power outputs based on power levels of at least some of the power supplies and power requirements of at least some of the loads.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 2 illustrates example circuitry for powering a wireless transceiver using one of multiple power supplies according to one embodiment of this disclosure;

FIGS. 3 through 6 illustrate example power distributors for powering different tasks in a wireless transceiver using one or multiple power supplies according to one embodiment of this disclosure;

DETAILED DESCRIPTION

Figure 1:
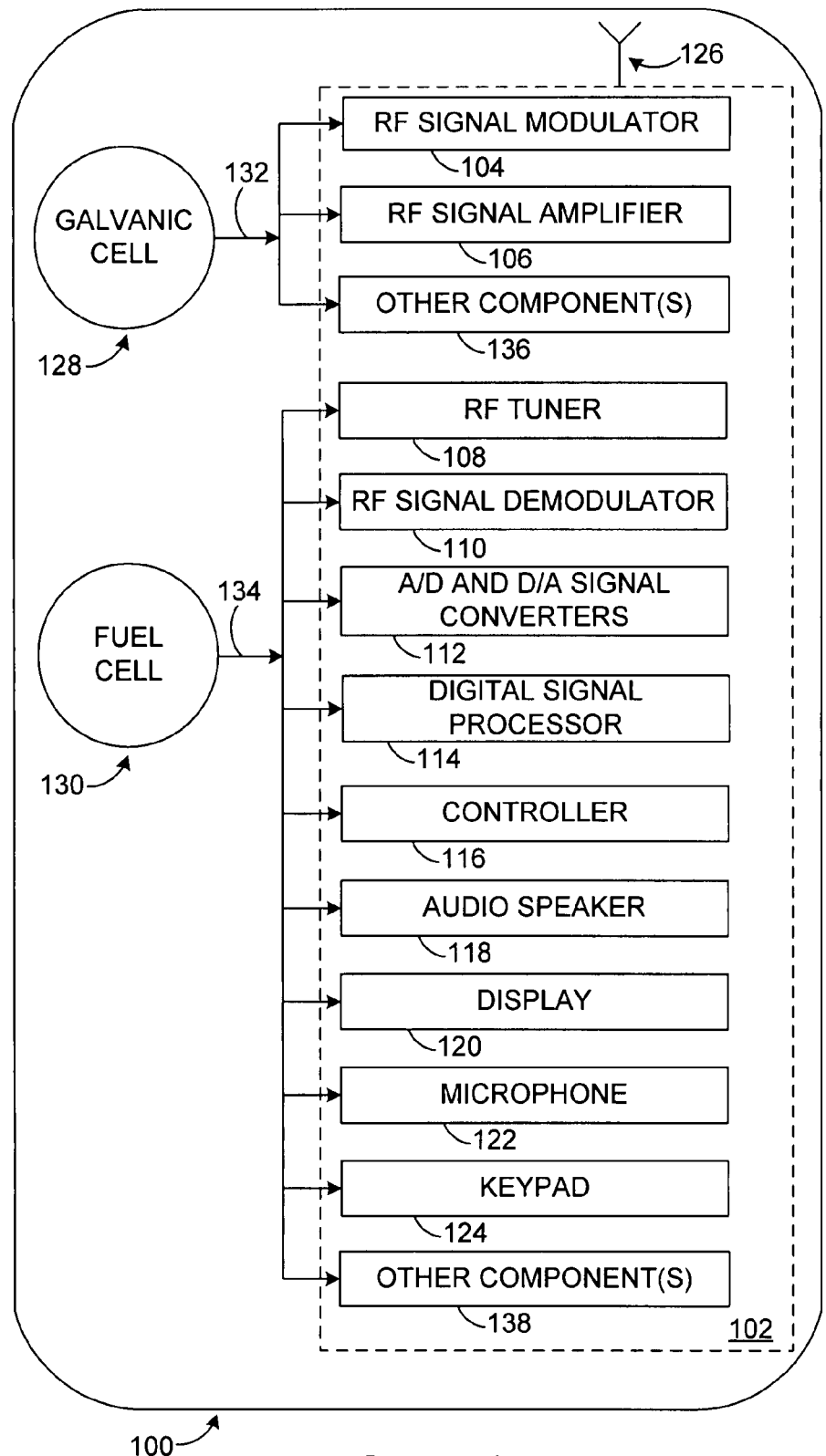
FIG. 1 illustrates an example wireless transceiver according to one embodiment of this disclosure.

FIG. 1 illustrates an example wireless transceiver 100 according to one embodiment of this disclosure. The embodiment of the wireless transceiver 100 shown in FIG. 1 is for illustration only. Other embodiments of the wireless transceiver 100 could be used without departing from the scope of this disclosure.

In this example embodiment, the wireless transceiver 100 could be used in or form part of any suitable type of device or system. For example, the wireless transceiver 100 could be used in mobile telephones, pagers, two-way radios, remote-controlled appliances, models, toys, wireless fidelity ("WiFi") devices, and wireless sensors. Although the wireless transceiver 100 may be described below as being used in (and may be illustrated as containing components of) a mobile telephone, the wireless transceiver 100 could be used in any of these or other devices. Also, the wireless transceiver 100 could use any suitable wireless signals to communicate. Although the wireless transceiver 100 may be described below as using radio frequency (RF) signals to communicate, the wireless transceiver 100 could use any other or additional type(s) of wireless signals.

As shown in FIG. 1, the wireless transceiver 100 includes a variety of components 102 that perform various tasks or functions in the wireless transceiver 100. For example, the components 102 include an RF signal modulator 104, an RF signal amplifier 106, an RF signal tuner 108, and an RF signal demodulator 110. The RF signal modulator 104 includes any suitable structure for modulating data onto an outgoing RF signal for transmission. The RF signal amplifier 106 includes any suitable structure for amplifying RF signals. The RF signal tuner 108 includes any suitable structure for tuning the wireless transceiver 100 to a specified RF frequency or frequencies. The RF signal demodulator 110 includes any suitable structure for demodulating data in an incoming RF signal received by the wireless transceiver 100. The transmission and reception of RF signals could occur using an antenna 126, which represents any suitable structure capable of transmitting and receiving RF or other wireless signals.

The components 102 also include analog-to-digital (A/D) and digital-to-analog (D/A) signal converters 112, a digital signal processor (DSP) 114, and a controller 116. The converters 112 include any suitable structure(s) for converting analog signals into digital signals or digital signals into analog signals. The DSP 114 includes any suitable structure for processing signals, such as signals to be provided to the RF signal modulator 104 for transmission or signals received by the RF signal demodulator 110. The controller 116 includes any suitable structure for controlling the overall operation of the wireless transceiver 100, such as a microprocessor or microcontroller.

In addition, the components 102 include various input/output elements, such as an audio speaker 118, a display 120, a microphone 122, and a keypad 124. The audio speaker 118 includes any suitable structure for recreating audible sounds for a user. The display 120 includes any suitable structure for displaying images (still or video), such as a liquid crystal display. The microphone 122 includes any suitable structure for capturing audio information. The keypad 124 includes any suitable structure for receiving input from a user via buttons, such as physical buttons or a display screen with "soft" buttons.

As shown in FIG. 1, the wireless transceiver 100 also includes multiple power supplies. In this document, the term "battery" broadly refers to any electrochemical device that stores energy and makes it available in an electrical form, such as in the form of direct current (DC). A battery could include one or more cells, such as batteries having a single cell or an interconnected array of multiple cells (like a voltaic pile). A battery could also include one or more battery packs, where multiple identical or similar batteries or battery cells are configured in series, parallel, or a mixture of both. A battery could further include a battery regulator (a component used to keep the peak voltage of an individual battery or cell below its maximum value so as to allow weaker batteries to be fully charged, bringing the whole pack back into balance) and/or a battery balancer (a device that can shuttle energy from strong cells to weaker ones in real time for even better balance). Examples batteries include Galvanic cells and fuel cells. In particular embodiments, each battery in the wireless transceiver 100 is dedicated to a single power conduit.

In this example, the power supplies in the wireless transceiver 100 include a Galvanic cell 128 and a fuel cell 130. The phrase "Galvanic cell" refers to an electro-chemical energy storage device having two metals connected by an electrolyte, which forms a salt bridge between the metals. Any suitable type(s) of Galvanic cell 128 may be used in the wireless transceiver 100. For example, Galvanic cells can include wet cells, gel cells, and dry cells. Galvanic cells may also represent primary Galvanic cells or secondary Galvanic cells. Primary Galvanic cells (also referred to as "disposable" batteries) are generally intended to be used once until the chemical changes that induce the electrical current supply are complete, at which point the battery is typically discarded. Primary Galvanic cells can include zinc-carbon batteries, zinc-chloride batteries, alkaline/manganese batteries, silver-oxide batteries, lithium batteries, mercury batteries, and zinc-air batteries. Secondary Galvanic cells (also referred to as "rechargeable" batteries) are characterized in that they can be readily re-charged after being drained of electrical potential. Recharging is typically performed by applying an externally supplied electrical current, which causes the electrochemical reactions that occur during use to be reversed. Secondary Galvanic cells can include lithium ion batteries, lithium ion polymer batteries, sodium sulfur (NaS) batteries, nickel metal hydride batteries, nickel-cadmium batteries, sodium-metal chloride batteries, and nickel-zinc batteries. In particular embodiments, Galvanic cells 128 used in the wireless transceiver 100 have a capacity of at least about 700 milliamps per hour.

In this document, the term "fuel cell" refers to an electrochemical energy storage device in which the energy of a reaction between a fuel (such as hydrogen or methanol) and an oxidant (such as oxygen) is converted directly and continuously into electrical energy. A fuel cell 130 may have a central electrolyte sandwiched between two electrodes. These electrodes often contain a catalyst, such as a metal, to increase the rate of the electrochemical reaction. The type of metal used for a catalyst may depend on the type of fuel that the cell uses. While the electrodes within a Galvanic cell may react and change as the cell is charged or discharged, a fuel cell's electrodes may be catalytic and relatively stable. This may provide the fuel cell with the ability to be quickly regenerated and to suffer from little or no derogation of power from the regeneration.

Any suitable type(s) of fuel cell 130 may be used in the wireless transceiver 100. For example, a micro fuel cell could be adapted for use in a portable device, such as a mobile telephone. In some embodiments, one or more fuel cells 130 in the wireless transceiver 100 represent one or more of the following: a polymer electrolyte membrane fuel cell (PEMFC), a direct methanol fuel cell (DMFC), or an alkali fuel cell (AFC). In particular embodiments, a fuel cell 130 may have one or more of the following characteristics: an operating temperature of less than about 200° F., relatively light weight, a short warm-up period, an immediate response to increased demand for power, and an adaptability to small sizes.

Polymer electrolyte membrane fuel cells (also known as proton exchange membrane fuel cells) may utilize thin polymer sheets as an electrolyte. The polymer sheets can be coated with a thin layer of platinum or other catalyst to increase the speed of the reaction, and the electrodes can be made of porous carbon. Polymer electrolyte membrane fuel cells may generally have an efficiency of about 40 to 50 percent and may be well suited for wireless transceivers 100. For example, they may operate at relatively low temperatures (such as 175° F.), can be designed in different sizes depending upon the amount of voltage required, may have very little warm-up time, and can respond immediately to increased demand for power. Moreover, polymer electrolyte membrane fuel cells are often easy to seal, handle, and assemble.

Direct methanol fuel cells also use a polymer electrolyte membrane. However, these fuel cells use a methanol solution (such as about 25 percent methanol in water), rather than pure hydrogen as fuel. The electrolyte's catalyst (such as platinum) may pull the hydrogen directly from the methanol. The hydrogen's proton (or positive ion) and electron are then separated. The electron travels around the outside of the membrane to produce a flow of current, while the proton travels across the membrane electrolyte to the cathode where it retrieves an electron that has completed its path around the membrane. The proton and electron combine and react with oxygen to form water. Direct methanol fuel cells may be approximately 40 percent efficient at an operating temperature of about 120° F. to about 150° F. Relative to other fuel cells, this efficiency may be low. Because direct methanol fuel cells operate directly with liquid methanol and at relatively low temperatures, though, they may work well for wireless transceivers 100.

Alkali fuel cells typically use a concentrated solution of potassium hydroxide (KOH) in water as an electrolyte. Hydroxyl ions (OH—) migrate from the cathode to the anode in these fuel cells. Hydrogen gas supplied to the anode reacts with the OH— ions to produce water, and this reaction releases electrons that provide electrical power. Alkali fuel cells may have an efficiency of 60 percent and can operate at low temperatures, ranging from about 75° F. to about 160° F. Alkali fuel cells may also start quickly, and they may have low power density output.

In FIG. 1, the Galvanic cell 128 could represent a AAA battery or other type of battery, and the fuel cell 130 could represent a micro fuel cell. In particular embodiments, the Galvanic cell 128 represents a lithium ion battery or a nickel metal hydride battery, and the fuel cell 130 represents a direct methanol fuel cell.

In one aspect of operation, multiple power supplies may be independently applied to tasks in the wireless transceiver 100. For example, different tasks could be powered by different power supplies depending on the current requirements of the tasks. As a particular example, the wireless transceiver 100 could include two or more different types of power supplies, where each power supply is dedicated to supplying power to specific types of tasks (such as applying one power supply to higher-current tasks and another power supply to lower-current tasks).

As shown here in FIG. 1, the Galvanic cell 128 and the fuel cell 130 are electrically partitioned into separate power conduits 132-134. In this document, the phrase "power conduit" refers to an electrically conductive circuit for transmitting electrical current generated by a power supply to at least one module, component, or other structure that is designed to perform a certain task. The power conduits 132-134 could, for example, include solid-state circuitry and are isolated from each other.

In the illustrated embodiment, the power supplies in the wireless transceiver 100 are disposed so as to form separate and independent power conduits 132-134, where each conduit is dedicated to particular tasks. The transfer of current may power the modules in each conduit so that the modules may perform their intended tasks. Each power conduit may be isolated from other conduits. A conduit may also be interconnected to other conduit(s) by device circuitry and electrically isolated from one another (such as by using a voltage regulator, a dropout linear regulator, or some other device).

In this example, the Galvanic cell 128 is used to provide power to higher-current tasks in the wireless transceiver 100. As shown in FIG. 1, the power conduit 132 transfers electrical current from the Galvanic cell 128 to components 104-106. These components 104-106 may require a higher-current power source to function properly, meaning the tasks performed by these components 104-106 demand relatively high electrical current. The Galvanic cell 128 could also be used to provide power to higher-current tasks performed by other components 136. For example, modern mobile telephones often include built-in digital cameras capable of capturing high-resolution still and video images. These high-performance cameras often require a high-power white-light source for camera use indoors or in dim ambient light. Sources of high-power white-light, such as white light emitting diodes (LEDs) and flash Xenon modules, can be used for subject lighting and are often used as a primary light source in mobile telephones equipped with cameras. While well-suited to the task of subject lighting, these dedicated high-output-power camera flashes (which typically have a 350 mA to 700 mA forward operating current) represent a significant source of power drain on the Galvanic cell 128. Other types of components that may require higher current include stereo audio amplifiers and micro-motors for driving auto-focusing camera lenses.

In this example, the fuel cell 130 is used to provide power to lower-current tasks in the wireless transceiver 100. As shown in FIG. 1, the power conduit 134 transfers electrical current from the fuel cell 130 to components 108-124. The tasks performed by these components 108-124 may demand relatively low electrical current. The power produced by the fuel cell 130 can also be applied to lower-current tasks performed by other components 138. For example, the fuel cell 130 could be used to power a ringer, digital television receiver, high fidelity ("hi-fi") MP3 player, charge-coupled device (CCD) based camera, FM tuner, 3-D graphics accelerator chip, or flash memory in a device. In addition, the fuel cell 130 could be used to power short-range, low-power transmitters such as BLUETOOTH modules. For instance, the KYOCERA RB06 SERIES BLUETOOTH RF module may typically consume only 36 mA during RF transmission and 38 mA during RF reception.

The following represent particular examples of the types of current draw that could occur in the wireless transceiver 100.

As a first example, a wireless sensor's sleep mode and idle mode (lower-current tasks) could typically consume about 5 µA and 5 mA, respectfully. In contrast, RF transmission (a higher-current task) could typically consume about 100 mA. As another example, a mobile telephone's stand-by mode (a lower-current task) could typically consume from about 100 mA to about 300 mA, whereas RF transmission (a higher-current task) could typically consume from about 1 A to about 3 A. These values are for illustration only and should not be construed as limiting. That is, the relative current draw of "low" or "lower" versus "high" or "higher" current tasks may be dependent upon various factors, such as the particular device or system being powered. The determination of higher-current and lower-current ranges can easily be made depending on particular needs While not shown in FIG. 1, a component in the wireless transceiver 100 may be powered by different power supplies at different times. This could involve various techniques for distributing power from the power supplies to the tasks in the wireless transceiver 100. Additional details regarding this functionality are provided below.

The partitioning of power sources in the wireless transceiver 100 may help to improve or optimize the performance of the Galvanic cell 128 and/or the fuel cell 130. For example, the use of the Galvanic cell 128 and the fuel cell 130 may help to increase the power supplies' effective life in a wireless sensor or other device by applying power from the fuel cell 130 to certain lower-current tasks and applying power from the Galvanic cell 128 to certain higher-current tasks. This may allow a more appropriate power supply to be used to power the components of the wireless transceiver 100 in a more efficient manner. For instance, fuel cells may be more ideal for powering non-transmission tasks in the wireless transceiver 100 as they may provide low current at an extremely high energy density. Galvanic cells, on the other hand, may be well suited for powering intermittent or higher-current tasks in the wireless transceiver 100 (such as RF transmission tasks). Thus, this power optimization technique may be useful when higher-current tasks are powered by a Galvanic cell 128 and lower-current tasks are powered by a fuel cell 130. For example, the fuel cell 130 may be adapted to power RF receiver circuitry in the wireless transceiver 100, while the Galvanic cell 128 may be adapted to power RF transmitter circuitry in the wireless transceiver 100.

This power optimization technique may also help to increase the maintenance cycle of the wireless transceiver 100 (the time between battery charges). The fuel cell 130 may support a current draw over longer periods of time, and the power generated by the Galvanic cell 128 may be conserved for intermittent, higher-current tasks.

While the different power supplies in the wireless transceiver 100 have been described as providing power to lower-current and higher-current tasks, the power supplies could provide power in any other suitable manner. For example, the Galvanic cell 128 could provide power to intermittent tasks, while the fuel cell 130 could provide power to continuous tasks. It may or may not be the case that the intermittent tasks are higher-current tasks and the continuous tasks are lower-current tasks.

Although FIG. 1 illustrates one example of a wireless transceiver 100, various changes may be made to FIG. 1. For example, the associations of specific components 102 with specific power supplies 128-130 are for illustration only. A particular component 102 could be permanently or temporarily associated with a different power supply in the wireless transceiver 100. Also, the functional division shown in FIG. 1 is for illustration only. Various components could be combined or omitted and additional components could be added according to particular needs. Further, while shown as including components 104-124 and 136-138, some or all of these components could be omitted from the wireless transceiver 100 or reside externally to the wireless transceiver 100. In addition, FIG. 1 illustrates one example of a device in which the technique for optimizing power supplies could be implemented. The power optimization technique could be used in any other suitable device or system.

FIG. 2 illustrates example circuitry 200 for powering a wireless transceiver using one of multiple power supplies according to one embodiment of this disclosure. The embodiment of the circuitry 200 shown in FIG. 2 is for illustration only. Other embodiments of the circuitry 200 could be used without departing from the scope of this disclosure. Also, for ease of explanation, the circuitry 200 is described as being used in the wireless transceiver 100 of FIG. 1. The circuitry 200 could be used in any other device or system.

As shown in FIG. 2, the circuitry 200 includes a voltage regulator 202, a variable power consumption load 204, a voltage-to-current source 206, a voltage comparator 208, resistors 210-214, a capacitor 216, and a switch 218. The voltage regulator 202 includes any suitable structure for maintaining the peak voltage of a power supply (either the Galvanic cell 128 or the fuel cell 130) below a maximum value.

The variable power consumption load 204 represents a load powered by the output of the voltage regulator 202. The variable power consumption load 204 could, for example, represent various components in the wireless transceiver 100. As a particular example, the variable power consumption load 204 could represent different combinations of the components 102 in the wireless transceiver 100, where the specific combination of components 102 represents the components currently being used by the wireless transceiver 100.

The voltage-to-current source 206 includes any suitable structure for converting a voltage value into a proportional current. The voltage comparator 208 includes any suitable structure for comparing two voltages, such as by comparing a voltage produced between the resistors 212-214 to a reference voltage. The resistors 210-214 represent resistors having any suitable resistance(s). The capacitor 216 represents a capacitor having any suitable capacitance. The switch 218 operates to couple different power supplies to the voltage regulator 202. The switch 218 includes any suitable structure for switching inputs to the voltage regulator 202.

In one aspect of operation, the switch 218 may cause the fuel cell 130 to be coupled to the voltage regulator 202 under a low output condition. The low output condition could, for example, represent a condition where only lower-current tasks in the wireless transceiver 100 currently form the variable power consumption load 204. The low output condition could be detected by the voltage comparator 208. When a high-output condition exists, the switch 218 may couple the Galvanic cell 128 to the voltage regulator 202. The high output condition could, for example, represent a condition where one or more higher-current tasks in the wireless transceiver 100 currently form the variable power consumption load 204. The high output condition could be detected by the voltage comparator 208. In this way, the circuitry 200 can provide the appropriate level of power to the variable power consumption load 204 by selecting the appropriate power supply.

Although FIG. 2 illustrates one example of circuitry 200 for powering a wireless transceiver using one of multiple power supplies, various changes may be made to FIG. 2. For example, any other suitable technique could be used to identify whether a low-output condition or high-output condition exists and to supply power to components in the wireless transceiver.

FIGS. 3 through 6 illustrate example power distributors for powering different tasks in a wireless transceiver using one or multiple power supplies according to one embodiment of this disclosure. The embodiments of the power distributors shown in FIGS. 3 through 6 are for illustration only. Other embodiments of the power distributors could be used without departing from the scope of this disclosure. Also, for ease of explanation, the power distributors are described as being used in the wireless transceiver 100 of FIG. 1. The power distributors could be used in any other device or system.

As shown in FIG. 3, a power distributor 300 is used to distribute power from one or multiple power supplies 302a-302n to one or multiple loads 304a-304n. The power supplies 302a-302n provide power to the loads 304a-304n, such as by providing higher or lower levels of current to the loads 304a-304n. Each of the power supplies 302a-302n represents any suitable power source for providing power to one or more loads 304a-304n. The power supplies 302a-302n could, for example, include different types of power supplies, such as the Galvanic cell 128 and the fuel cell 130 in the wireless transceiver 100.

The loads 304a-304n represent different components or tasks that function using power from one or more of the power supplies 302a-302n. The loads 304a-304n could represent any suitable structures for performing a wide variety of functions. The loads 304a-304n could, for example, represent various components 102 in the wireless transceiver 100.

A multiplexer 306 selectively couples various ones of its inputs to various ones of its outputs, thereby selectively coupling the power supplies 302a-302n to the loads 304a-304n. For example, the multiplexer 306 could couple a single power supply to a single load, a single power supply to multiple loads, or multiple power supplies to multiple loads. The multiplexer 306 could also be reconfigured when a load needs more or less power than it is currently receiving from a power supply. The multiplexer 306 includes any suitable structure for selectively coupling power supplies 302a-302n to loads 304a-304n.

A controller 308 controls the operation of the multiplexer 306. For example, the controller 308 may provide control signals to the multiplexer 306 to control how the multiplexer 306 couples its inputs to its outputs. By doing this, the controller 308 effectively controls how the multiplexer 306 couples the power supplies 302a-302n to the loads 304a-304n. The controller 308 may use any suitable technique to control how the multiplexer 306 couples the power supplies 302a-302n to the loads 304a-304n, several examples of which are provided in more detail below. The controller 308 includes any suitable hardware, software, firmware, or combination thereof for controlling the multiplexer 308.

In one aspect of operation, the multiplexer 306 (under the control of the controller 308) couples the appropriate power supply or supplies to the appropriate load or loads. In some embodiments, the controller 308 controls the multiplexer 306 based on power requirements of the loads 304a-304n and/or characteristics of the power supplies 302a-302n. In these embodiments, the selective coupling performed by the multiplexer 306 and controlled by the controller 308 could be performed dynamically in response to changing needs of the loads 304a-304n and/or changing conditions or statuses of the power supplies 302a-302n. This may allow, for example, the power supplies' characteristics to be monitored by the controller 308 to determine power availability. This may also allow the states of the loads 304a-304n to be monitored by the controller 308 to determine the loads' expected power requirements. Together, the power requirements and the power availabilities can be used to form appropriate connections between the power supplies 302a-302n and the loads 304a-304n.

Figure 4:
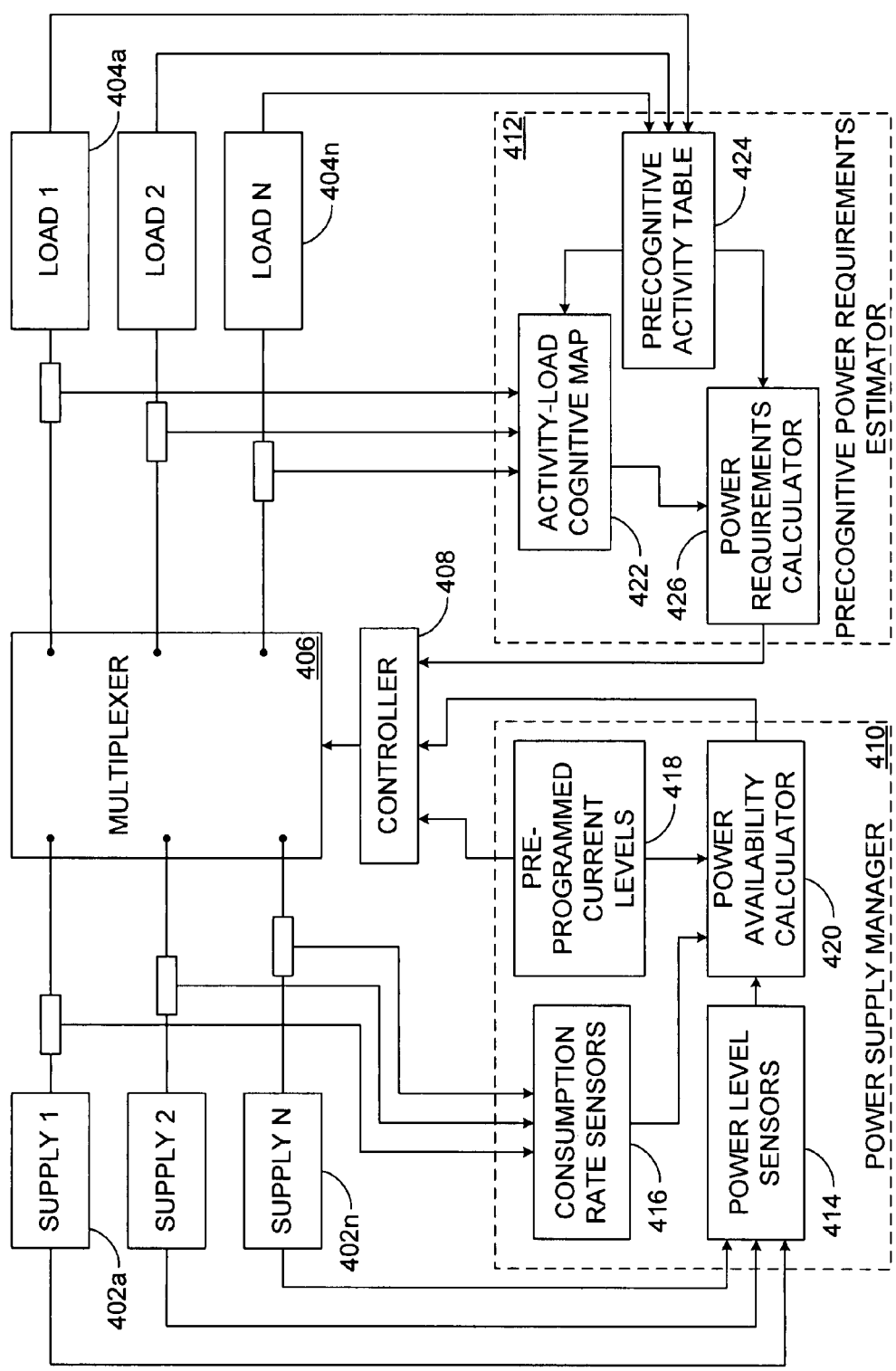

FIG. 4 illustrates a more detailed power distributor 400. The power distributor 400 may operate in the same or similar manner as the power distributor 300 in FIG. 3. A multiplexer 406, under the control of a controller 408, couples various power supplies 402a-402n to various loads 404a-404n.

In this example, the controller 408 receives input from a power supply manager 410 and from a precognitive power requirements estimator 412. The power supply manager 410 identifies the power availability for each of the power supplies 402a-402n. This may allow the controller 408 to assign power supplies to loads with knowledge of the amount of power that can be provided by the power supplies. The power requirements estimator 412 estimates the power requirements of the loads 404a-404n. This may allow the controller 408 to assign power supplies to loads with knowledge of the estimated amount of power required by the loads.

In this example, the power supply manager 410 includes power level sensors 414, consumption rate sensors 416, a storage device 418 storing pre-programmed current levels, and a power availability calculator 420. The current characteristics of the power supplies 402a-402n can be measured by the power level sensors 414, such as sensors identifying the current power levels provided by each of the power supplies 402a-402n. The consumption of power from the power supplies 402a-402n can be measured by the consumption rate sensors 416. If any of the power supplies 402a-402n has one or more pre-programmed current levels that it can provide, these values can be stored in the storage device 418. The power availability calculator 420 receives information from the power level sensors 414, consumption rate sensors 416, and storage device 418 and estimates the available power for each of the power supplies 402a-402n. The power availability calculator 420 provides the estimated available power for each of the power supplies 402a-402n to the controller 408, and the pre-programmed current levels can also be provided to the controller 408. The controller 408 may use this information to couple appropriate power supplies to the loads. The sensors 416-418 may take any suitable form now known or developed in the future, may be hardwired or wireless, and may be battery operated or line powered. The storage device 418 may represent any suitable storage and retrieval device (s), such as volatile or non-volatile memory. The power availability calculator 420 includes any hardware, software, firmware, or combination thereof for calculating the available power from at least one power supply.

The power requirements estimator 412 includes an activity-load cognitive map 422, a precognitive activity table 424, and a power requirements calculator 426. The activity-load cognitive map 422 generates current load activity information. The activity-load cognitive map 422 may, for example, measure the actual current load consumption characteristics for different statuses of the loads 404a-404n. The different statuses could include active, idle, and sleeping states or various different forms of operation. The power requirements of these different statuses may also be provided by the cognitive map 422. The precognitive activity table 424 provides information about the expected power use of the loads 404a-404n. This information may take different forms, such as by identifying whether a load is actually active or identifying times during which a load may become active and for how long such activity may occur. The power requirements calculator 426 receives information from the cognitive map 422 and the table 424 and calculates the power needs of the loads 404a-404n, such as how many milliamps per hour are needed and for how long. This information is provided to the controller 408, which can use the information to couple the appropriate power supply to each load.

The controller 408 receives the power availability information and the power requirements information from the power supply manager 410 and the power requirement estimator 412. The controller 408 uses this information to decide how to connect the power supplies 402a-402n to the loads 404a-404n to provide desired or more effective use of the various power supplies. In some embodiments, the connections may be selected to optimally use the various power supplies to provide power to the loads.

Figure 5:
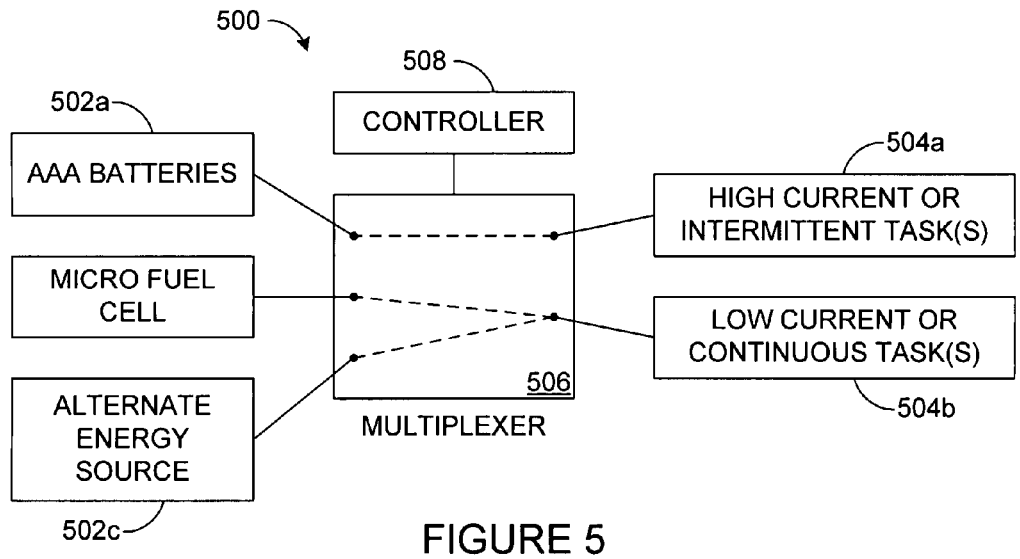
Figure 6:
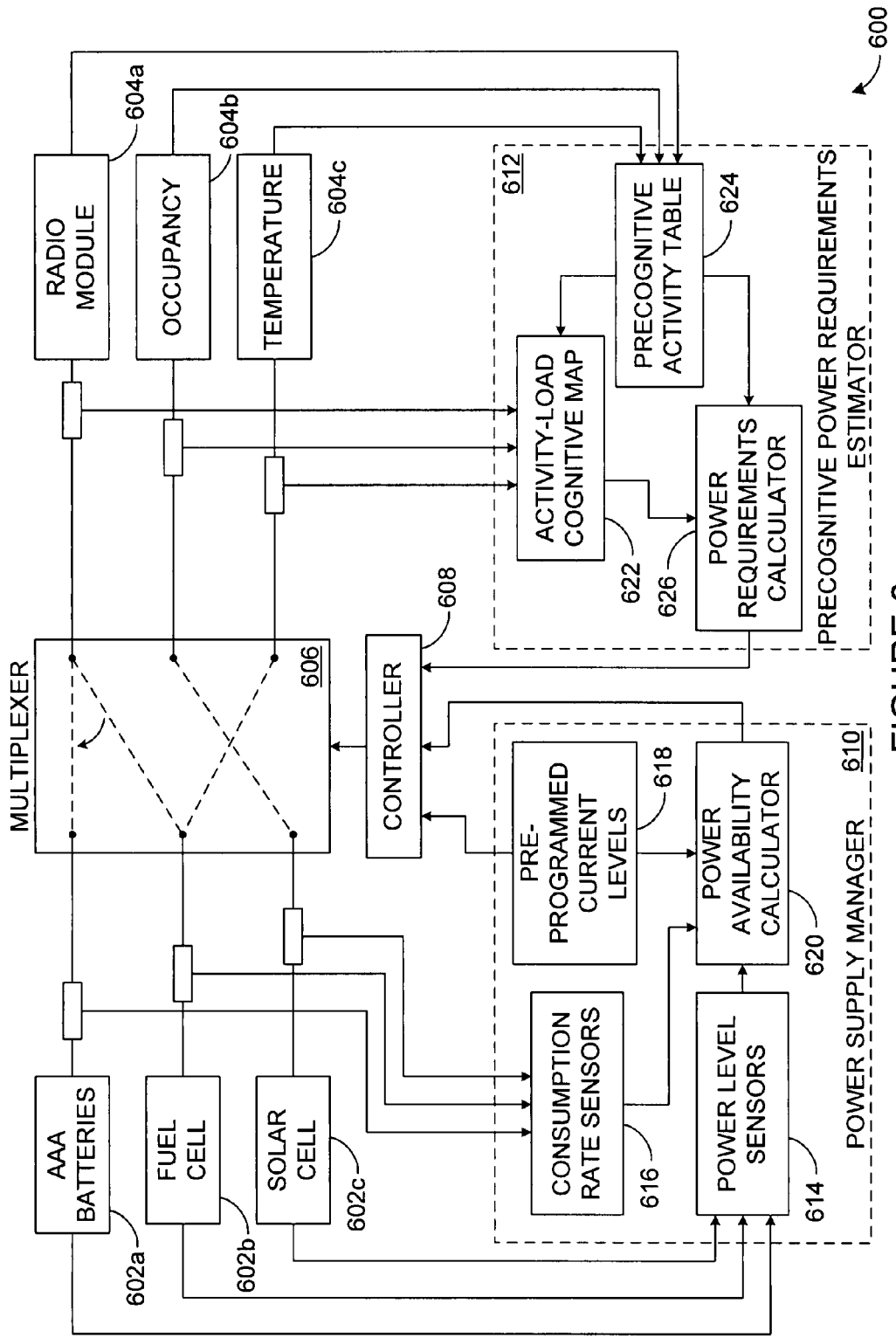

FIGS. 5 and 6 illustrate specific examples of how the power distributors of FIGS. 3 and 4 can be used. In FIG. 5, three types of power supplies 502a-502c are provided: one or more AAA batteries, a micro fuel cell, and an alternate energy source (such as a solar cell, piezo-electric fibers for generating power through vibration, or other source). Also, two types of loads 504a-504b are present: one or more higher-current or intermittent tasks and one or more lower-current or continuous tasks. A multiplexer 506 couples various ones of the power supplies 502a-502c to the loads 504a-504b under the control of a controller 508. In particular embodiments, the multiplexer 506 may initially couple the one or more AAA batteries to the higher-current or intermittent tasks and the fuel cell or the alternate energy source to the lower-current or continuous tasks. The controller 508 may then change the connections as conditions in the wireless transceiver 100 change.

In FIG. 6, three types of power supplies 602a-602c are provided: one or more AAA batteries, a micro fuel cell, and a solar cell. Also, three loads 604a-604c are present: a radio module, an occupancy sensor, and a temperature sensor. A multiplexer 606 couples various power supplies to the loads under the control of a controller 608. Information about the power supplies 602a-602c is generated by a power supply manager 610, and information about the loads 604a-604c is generated by a power requirements estimator 612.

In this example, the fuel cell is initially used to power the radio module and the temperature sensor, while the solar cell is initially used to power the occupancy sensor. The fuel cell may be used to power the radio module in this example when the radio module is operating in a lower-power, sleep, or idle mode. However, the radio module could transition from its lower-power mode to an active mode, which prompts the controller 608 to cause the multiplexer 606 to couple the AAA batteries to the radio module. Once the radio module reenters the lower-power state, the multiplexer 606 could again couple the radio module to the fuel cell.

In the power supply manager 610, power level sensors 614 could determine that the AAA batteries have a medium power level, the fuel cell has a high power level, and the solar cell has a medium power level. Consumption rate sensors 616 could determine that the consumption of power from the three power supplies is 0 mA/hr for the AAA batteries, 5 mA/hr for the fuel cell, and 1 mA/hr for the solar cell. The power supplies 602a-602c may also have pre-programmed current or voltage levels that they can provide, such as 0-5 μA for the fuel cell. A power availability calculator 620 provides indications of the available power for each power supply to the controller 608. For example, the power availability calculator 620 could determine that the AAA batteries can provide 50 mA/hr for 60 hours, the fuel cell can provide 100 mA/hr for 20 years, and the solar cell can provide 20 mA/hr for four hours.

In the power requirements estimator 612, a power requirements calculator 626 receives load activity information from an activity-load cognitive map 622 and a precognitive activity table 624. The cognitive map 622 may measure the actual current load consumption characteristics and power requirements for different statuses of the loads. In this example, the radio module may require 100 mA in transmit mode, 50 mA in receive mode, and 5 μA in idle mode. The occupancy sensor may require 1 mA in active mode and 5 μA in idle mode. The temperature sensor may require 1 mA in active mode and 5 μA in idle mode. The precognitive activity table 624 provides information about the expected power use of the loads. In this example, it may be known that the radio module is entering the transmit mode in 2 μs for a duration of 1 ms. Also, the occupancy sensor may be currently active, and the temperature sensor may be idle.

The power requirements calculator 626 receives this information and calculates the power needs of the loads, such as how many milliamps per hour are needed and for how long. For example, the power requirements calculator 626 may determine that the radio module will require 100 mA for 1 ms starting in 2 μs. The power requirements calculator 626 may also determine that the occupancy sensor will continue needing 1 mA for one minute and that the temperature sensor will continue needing 5 μA for ten seconds. The power requirements calculator 626 may further calculate how may milliamps per hour will be needed and for how long for each load. These calculations are examples only and are described for one example period of time. Conditions may vary, such as when loads are predicted to transition to different modes at different times. These types of calculations may be performed continuously or at various intervals as desired.

The information generated by the power requirements calculator 626 is provided to the controller 608 for use in coupling the appropriate power supplies to the loads. In this example, since it is known that the radio module will begin transmitting in 2 μs, the AAA batteries are coupled to the radio module to begin providing power to the radio module. The fuel cell continues providing power to the temperature sensor, and the solar cell continues providing power to the occupancy sensor.

The decision to switch the radio module to the AAA batteries for power may be a function of the expected amount of power required by the various loads and the abilities of the power supplies to provide the power. For example, the AAA batteries may have the ability to provide from 0 mA to 100 mA, while the fuel cell may only provide from 0 μA to 5 μA as indicated by the relevant information in the storage device 618. The storage device 618 could also indicate that the solar cell can provide from 0 mA to 75 mA. Thus, the AAA batteries may be better suited to provide the 100 mA that the radio module needs during its active mode. These are examples of current levels for the example power supplies shown in FIG. 6. The current levels for the supplies may vary, and the number and type of power supplies that may be utilized can also vary. Moreover, some loads may follow predetermined schedules (such as schedules for switching from idle to active mode), and some loads may react to the environment in which they are located. The power requirements estimator 612 may take such schedules into account and may also monitor conditions to predict mode changes of the loads. In particular embodiments, the loads may provide the power requirements estimator 612 with mode switching information to assist with power supply multiplexing management.

Although FIGS. 3 through 6 illustrate examples of power distributors for powering different tasks in a wireless transceiver using one or multiple power supplies, various changes may be made to FIGS. 3 through 6. For example, the number and type of power supplies, the number and type of loads, the number and type of sensors, and the number of inputs and outputs of the multiplexer in each figure are for illustration only. The number of inputs and outputs may be varied and need not be equal, and different numbers and types of sensors, power supplies, and loads may be used. As an example, many different power supplies could be used, such as larger or different types of batteries, thermal power supplies, wind power supplies, and many others. As another example, sensors that monitor power supplies may be used to monitor temperature, lux level, vibration, acoustics, ambient conditions, voltage levels, power levels, or other characteristics. In addition, the loads may represent actuators, display devices, and many other types of sensors or other devices.

Figure 7:
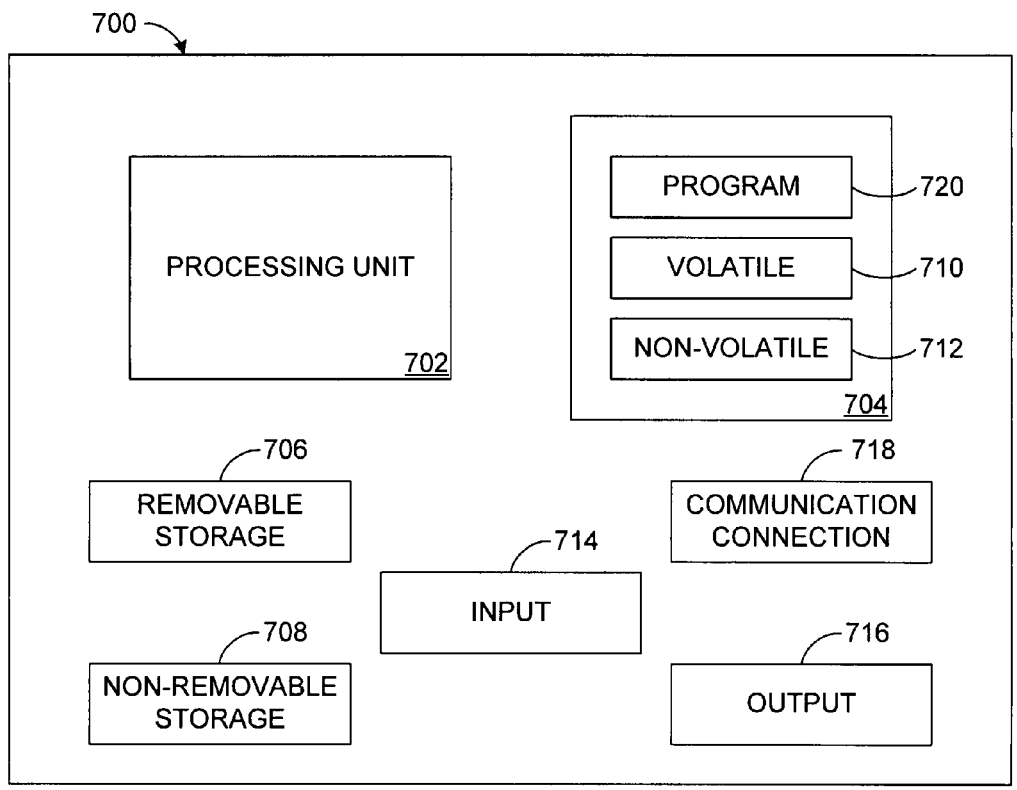
FIG. 7 illustrates an example device for supporting the optimized powering of a wireless transceiver according to one embodiment of this disclosure.

FIG. 7 illustrates an example device 700 for supporting the optimized powering of a wireless transceiver according to one embodiment of this disclosure. The embodiment of the device 700 shown in FIG. 7 is for illustration only. Other embodiments of the device 700 could be used without departing from the scope of this disclosure. Also, for ease of explanation, the device 700 is described as implementing various functions performed by the power distributors in FIGS. 3 through 6 in the wireless transceiver 100 of FIG. 1. The device 700 could be used with any other power distributor and wireless device or system.

In some embodiments, the controllers, power supply managers, and power requirements estimators in FIGS. 3 through 6 may be at least partially implemented using a general purpose or special purpose computing device(s) or system(s). FIG. 7 illustrates an example computing device that executes programming for performing various functions of these components. The device 700 in this example may represent a general purpose computing device that includes a processing unit 702, a memory 704, a removable storage 706, and a non-removable storage 708. The memory 704 may include volatile memory 710 and non-volatile memory 712. The device 700 includes or has access to a computing environment that includes a variety of computer readable media, such as volatile memory 706, non-volatile memory 708, removable storage 706, and non-removable storage 708. These media could include random access memory (RAM), read only memory (ROM), erasable programmable read-only memory (EPROM), electrically erasable programmable read-only memory (EEPROM), flash memory, or other memory technologies. These media could also include compact discs (CDs), digital video discs or digital versatile discs (DVDS), or other optical disc storage. The media could further include magnetic cassettes, magnetic tape, magnetic disk storage, other magnetic storage devices, or any other medium or media capable of storing computer readable instructions.

The device 700 may also include or have access to a computing environment that includes one or more input devices 714, output devices 716, and communication or network connections 718. For example, the device 700 may operate in a networked environment using the communication connection 718 to connect to one or more remote computers, which could include a personal computer (PC), a server, a router, a network PC, a peer device, or other common network node. The communication connection 718 may include a Local Area Network (LAN), a Wide Area Network (WAN), a portion of a global network such as the Internet, or other network(s).

Computer-readable instructions stored on a computer-readable medium can be executable by the processing unit 702. For example, a hard disc drive, CD, DVD, or RAM are some examples of computer readable media. As a particular example, a computer program 720 capable of providing a generic technique to perform access control checks for data access and/or for doing an operation on one of the servers in a component object model (COM) based system according to the teachings of this disclosure may be included on a CD or DVD and loaded onto a hard drive. The computer-readable instructions allow the device 700 to provide generic access controls in a COM based computer network system having multiple users and servers.

Although FIG. 7 illustrates one example of a device 700 for supporting the optimized powering of a wireless transceiver, various changes may be made to FIG. 7. For example, any other or additional hardware, software, firmware, or combination thereof could be used to support the optimized powering of a wireless transceiver. Also, the functional division shown in FIG. 1 is for illustration only. Various components could be combined or omitted and additional components could be added according to particular needs.

Figure 8:
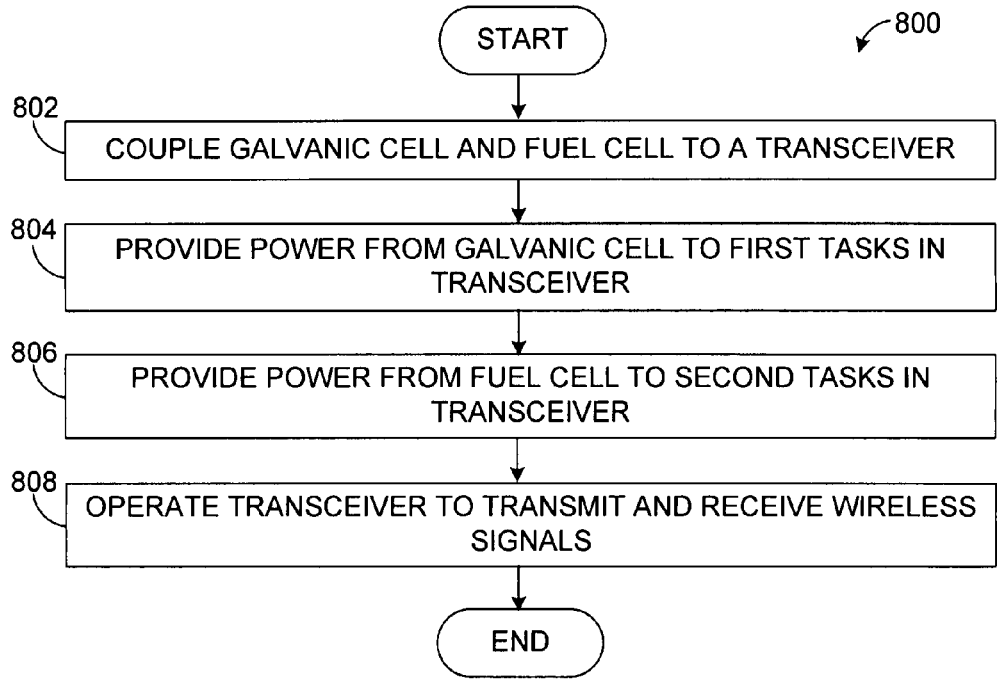
FIG. 8 illustrates an example method for optimizing power supplies in a wireless transceiver according to one embodiment of this disclosure.

FIG. 8 illustrates an example method 800 for optimizing power supplies in a wireless transceiver according to one embodiment of this disclosure. The embodiment of the method 800 shown in FIG. 8 is for illustration only. Other embodiments of the method 800 could be used without departing from the scope of this disclosure. Also, for ease of explanation, the method 800 is described with respect to the wireless transceiver 100 of FIG. 1, although the method 800 could be used with any other suitable device or system.

A transceiver is coupled to a Galvanic cell and a fuel cell at step 802. This could include, for example, coupling the wireless transceiver 100 to a primary or secondary Galvanic cell 128 and to a micro fuel cell 130.

Power from the Galvanic cell is provided to one or more first tasks in the transceiver at step 804, and power from the fuel cell is provided to one or more second tasks in the transceiver at step 806. This could include, for example, setting a multiplexer to couple the Galvanic cell 128 to one or more components 102 in the transceiver 100 performing tasks that are intermittent or that require higher current. This could also include setting the multiplexer to couple the fuel cell 130 to one or more components 102 in the transceiver 100 performing tasks that are continuous or that require lower current.

It should be noted that the same component in the wireless transceiver 100 could receive power from different power supplies at different times. For example, RF transmit components could receive power from the Galvanic cell 128 when the RF transmit components are in an active mode and from the fuel cell 130 when the RF transmit components are in an idle mode.

The wireless transceiver is operated to transmit and receive wireless signals at step 808. This may include, for example, using power from the Galvanic cell 128 to generate RF signals for wireless transmission. This could also include using power from the fuel cell 130 to process incoming RF signals. This could further include switching power provided to a radio module from the Galvanic cell 128 (when transmitting signals) to the fuel cell 130 (when receiving signals) and back again as the radio module or wireless transceiver switches states. Similar operations could occur for other components in the wireless transceiver 100.

Although FIG. 8 illustrates one example of a method 800 for optimizing power supplies in a wireless transceiver, various changes may be made to FIG. 8. For example, other or additional power supplies could be used to provide power to various tasks in the wireless transceiver.

Figure 9:
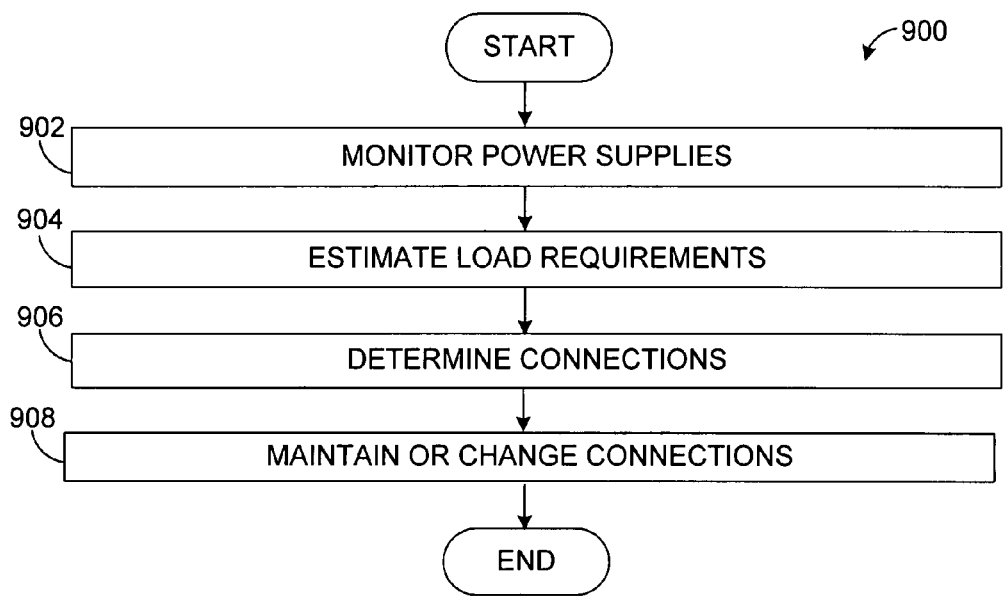
FIGS. 9 and 10 illustrate example methods for forming connections between different power supplies and different tasks in a wireless transceiver according to one embodiment of this disclosure.
Figure 10:
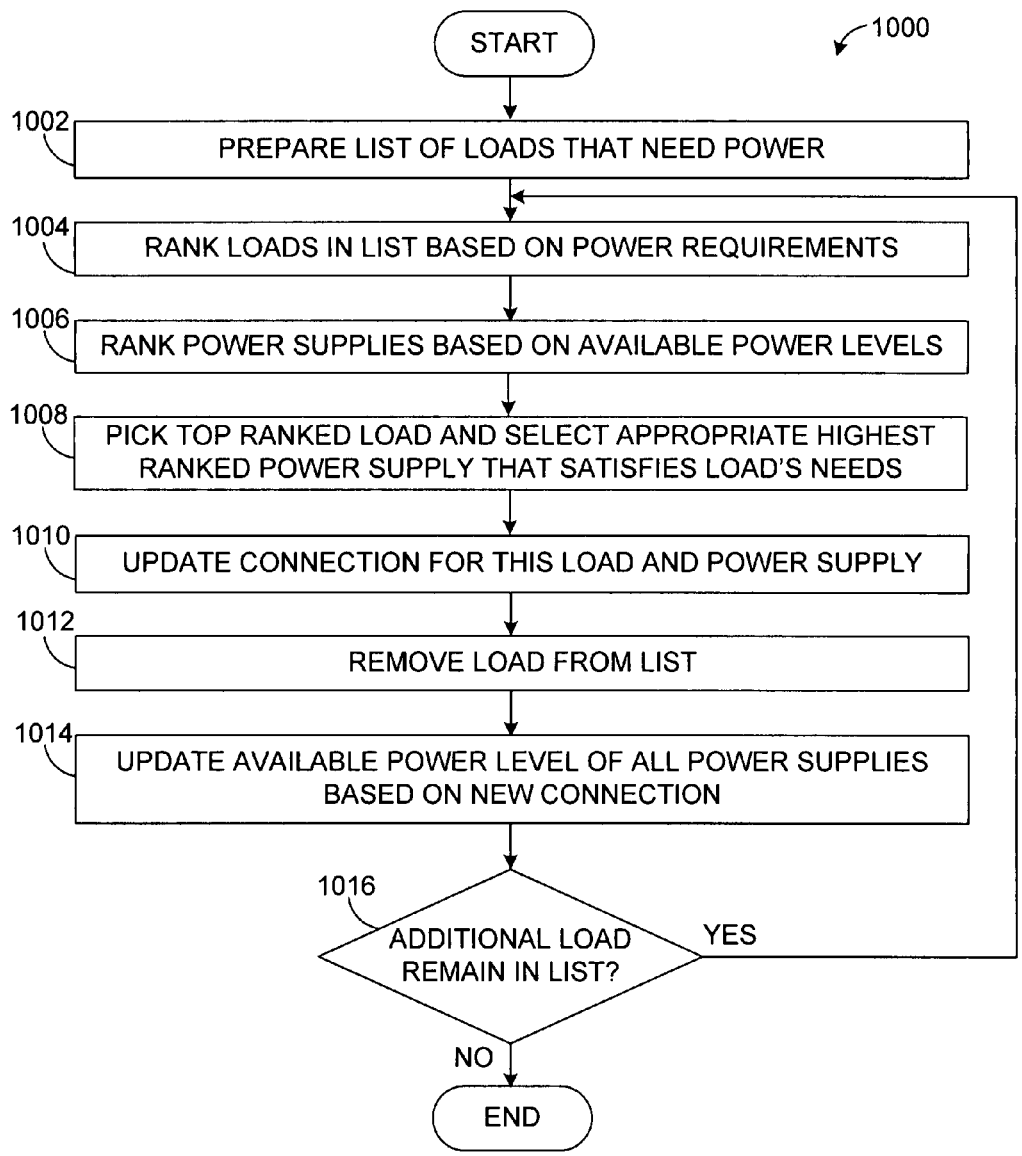

FIGS. 9 and 10 illustrate example methods for forming connections between different power supplies and different tasks in a wireless transceiver according to one embodiment of this disclosure. The embodiments of the methods shown in FIGS. 9 and 10 are for illustration only. Other embodiments of the methods could be used without departing from the scope of this disclosure.

As shown in FIG. 9, a method 900 includes monitoring various characteristics of multiple power supplies at step 902. This could include, for example, using power level sensors and consumption rate sensors to monitor the power levels and consumption rates associated with multiple power supplies. This could also include using a power consumption calculator to determine the available power from each of the power supplies.

Load requirements are estimated for multiple loads at step 904. This could include, for example, using a cognitive map, activity table, and power requirements calculator to estimate the power requirements for multiple loads. The power requirements for the loads may be based, for example, on projected future needs of the loads.

Connections between the power supplies and the loads are determined at step 906. This could include, for example, using a controller to determine how to satisfy the power requirements for the loads using the available power from the power supplies. Among other things, the controller could determine how to effectively utilize the power supplies and ensure proper operation of the loads.

The determined connections are implemented (either by maintaining/changing existing connections or implementing new connections) at step 908. This could include, for example, causing a multiplexer to couple the appropriate power supplies to the appropriate loads.

As shown in FIG. 10, a method 1000 can be used to determine connections between power supplies and loads. Note that voltage converters may be used on the load side to obtain proper voltage levels for the respective loads. Also, in some embodiments, one or multiple power supplies may be coupled to a single load if desired. In addition, the method 1000 could be performed at any suitable time, such as by repeating the method 1000 periodically or before any known impending mode change for a load.

A list of loads that need power is prepared at step 1002. The list could be prepared by any suitable component, such as a controller operable to control a multiplexer. The loads in the list are ranked based on their power requirements at step 1004. This could include, for example, ranking the loads in order of highest to lowest power requirements. The power supplies are also ranked based on their available power levels at step 1006. This could include, for example, ranking the power supplies in order of highest to lowest available power.

The top ranked load (the load with the highest power requirement) and the highest ranked power supply satisfying that load are selected at step 1008. This could include, for example, selecting the first load in the ranked load list. This may also include selecting the first power supply in the ranked power supply list that can provide the needed power to the selected load. A connection between the selected load and the selected power supply is updated at step 1010, such as by recording the connection in a list of connections to be formed.

The selected load is then removed from the list of loads at step 1012, and the available power levels for the power supplies are updated at step 1014 while taking into account the new connection. If additional loads remain in the list of loads at step 1016, the method 1000 returns to step 1004 to process an additional load. Otherwise, the method 1000 ends, and the recorded connections between the power supplies and the loads can be implemented, such as by configuring a multiplexer with the identified connections.

Although FIGS. 9 and 10 illustrate examples of methods for forming connections between different power supplies and different tasks in a wireless transceiver, various changes may be made to FIGS. 9 and 10. For example, while shown as a series of steps, various steps in FIGS. 9 and 10 could overlap, occur in parallel, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A method comprising:
   determining a power requirement of one or more first tasks in a wireless transceiver;
   selecting a first power supply to power the one or more first tasks based on the power requirement of the one or more first tasks;
   determining a power requirement of one or more second tasks in the wireless transceiver;
   selecting a second power supply to power the one or more second tasks based on the power requirement of the one or more second tasks;
   determining a change in the power requirement of the one or more first tasks; and selecting the first and second power supplies to power the one or more first tasks based on the change in the power requirement.

2. The method of claim 1, wherein:
the one or more first tasks comprise one or more higher-current or intermittent tasks; and
the one or more second tasks comprise one or more lower-current or continuous tasks.

3. The method of claim 2, wherein:
the first power supply comprises a Galvanic cell and is selected to power higher-current tasks; and
the second power supply comprises a fuel cell.

4. The method of claim 1, wherein:
the one or more first tasks comprise one or more tasks requiring current above a threshold; and
the one or more second tasks comprise one or more tasks requiring current below the threshold.

5. The method of claim 1, wherein determining the change in the power requirement of the one or more first tasks comprises retrieving an estimated power use, an estimated start time, and an estimated duration of a future task from an activity table.

6. The method of claim 4, wherein the one or more first tasks comprise transmission of a radio frequency (RF) signal.

7. The method of claim 6, wherein the transmission of the RF signal comprises at least one of: RF signal modulation and RF signal amplification.

8. The method of claim 4, wherein the one or more second tasks comprise reception of a radio frequency (RF) signal.

9. The method of claim 4, wherein the one or more second tasks comprise at least one of: radio frequency (RF) signal tuning, RF signal demodulation, analog-to-digital conversion, digital-to-analog conversion, digital signal processing, and operation of a controller.

10. The method of claim 4, wherein the one or more second tasks comprise at least one of: illumination of a display, operation of an audio speaker, operation of a microphone, and operation of a keypad.

11. An apparatus comprising:
a transmitter;
a receiver;
a first power supply;
a second power supply;
a multiplexer coupled to the transmitter, the receiver, and the first and second power supplies, the multiplexer operable to selectively couple the power supplies to the transmitter and receiver; and
a controller operable to:
determine a power requirement for each of the transmitter and the receiver;
control the selective coupling of the power supplies to the transmitter and the receiver based on the power requirements of the transmitter and receiver;
determine a change in the power requirement of at least one of the transmitter and the receiver; and
adjust the selective coupling of the power supplies to the at least one of the transmitter and the receiver based on the change in the power requirement.

12. The apparatus of claim 11, wherein:
the first power supply comprises a Galvanic cell; and
the second power supply comprises a fuel cell.

13. The apparatus of claim 11, further comprising:
a first power conduit from the first power supply to one of the transmitter and the receiver; and
a second power conduit from the second power supply to another of the transmitter and the receiver;
wherein the multiplexer is operable to establish the first and second power conduits.

14. The apparatus of claim 11, wherein the controller is configured to determine the change in the power requirement of at least one of the transmitter and the receiver by retrieving an estimated power use, an estimated start time, and an estimated duration of a future task from an activity table.

15. The apparatus of claim 11, wherein the transmitter comprises a radio frequency (RF) modulator, an RF amplifier, and an antenna.

16. The apparatus of claim 11, wherein the second power supply is operable to power the transmitter when the transmitter is operating in at least one of: a sleep mode, an idle mode, and a low-power mode.

17. The apparatus of claim 11, further comprising a digital-to-analog converter, an analog-to-digital converter, a digital signal processor, a controller, a speaker, a microphone, a display, and a keypad that are powered exclusively by the second power supply.

18. The apparatus of claim 11, wherein the apparatus forms at least part of a mobile telephone.

19. A computer readable medium embodying a computer program, the computer program comprising:
computer readable program code for determining a power requirement for each of multiple loads;
computer readable program code for selecting multiple connections between multiple power supplies and the multiple loads, the connections selected based on power levels of at least some of the power supplies and the power requirements of at least some of the loads;
computer readable program code for determining a change in the power requirement for at least one of the multiple loads;
computer readable program code for changing at least one of the connections between at least one of the power supplies and the at least one load based on the change in the power requirement; and
computer readable program code for initiating formation of and changing the connections.

20. The computer readable medium of claim 19, wherein:
the power supplies comprise at least one Galvanic cell and at least one fuel cell;
the loads comprise components in a wireless transceiver; and
the computer readable program code for initiating the formation of and changing the connections comprises computer readable program code for controlling a multiplexer, the multiplexer operable to form and change the connections.

21. An apparatus comprising:
a multiplexer having multiple power inputs operable to be coupled to multiple power supplies and multiple power outputs operable to be coupled to multiple loads, the multiplexer operable to selectively couple the power inputs to the power outputs; and
a controller operable to:
determine a power requirement for each of at least some of the loads;
control the selective coupling of the power inputs to the power outputs based on power levels of at least some of the power supplies and the power requirements of the at least some of the loads;
determine a change in the power requirement for at least one of the loads; and
change at least one coupling between at least one of the power outputs and at least one of the power inputs based on the change in the power requirement.

22. The apparatus of claim 21, wherein:
the power supplies comprise at least one Galvanic cell and at least one fuel cell; and
the loads comprise components in a wireless transceiver.

* * * * *